Dec. 1, 1936.  A. GARCIA  2,062,410

PLANT PROTECTOR

Filed Feb. 25, 1935

INVENTOR.
ANSELMO GARCIA.
BY
*H. A. Druckman*
ATTORNEY.

Patented Dec. 1, 1936

2,062,410

UNITED STATES PATENT OFFICE 2,062,410

PLANT PROTECTOR

Anselmo Garcia, Long Beach, Calif.

Application February 25, 1935, Serial No. 7,966

1 Claim. (Cl. 47—30)

This invention relates to a novel plant protector whereby small plants are protected at the time of planting from certain injurious insects of the cutting variety.

An object of my invention is to provide a novel plant protector formed of fibrous materials such as paper or the like and which is simple in construction and inexpensive to manufacture.

Another object is to provide a novel plant protector of the character stated which is placed around the plant at the time of planting and which will prevent beetles, worms, and the like from getting onto the young plant and destroying the same.

Other objects, advantages and features of invention may appear from the accompanying drawing, the subjoined detailed description and the appended claim.

Figure 1:
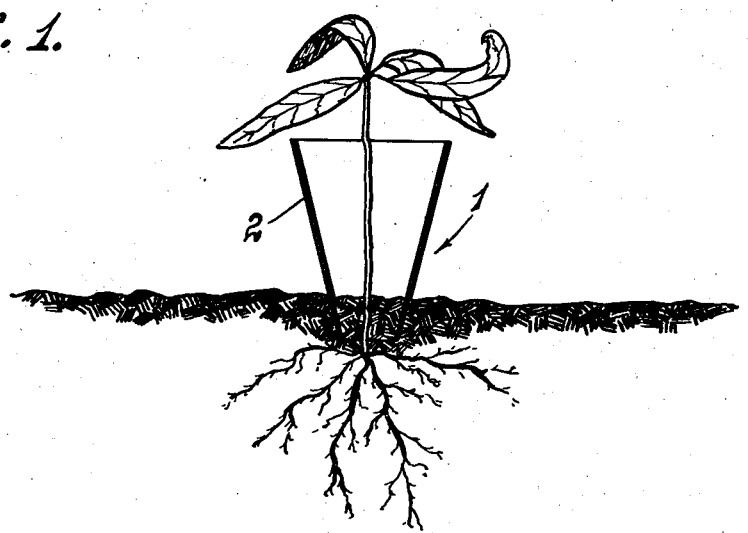
Figure 1 is a transverse, sectional view of my plant protector in position around a young plant.
Figure 2:
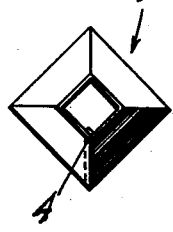
Figure 2 is a bottom plan view of a modified shape of plant protector.

Referring more particularly to the drawing, my plant protector consists essentially of a cup-like structure preferably conical, cylindrical, or prismatic in shape and which is open at the top and bottom so that it may be placed around the young plant prior to planting.

Figure 4:
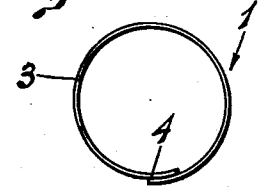
Figure 4 is a plan view of a cylindrical plant protector.
Figure 6:
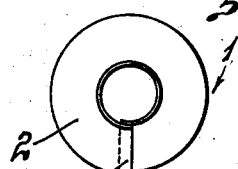
Figure 6 is a bottom plan view of a frusto conical protector.
Figure 3:
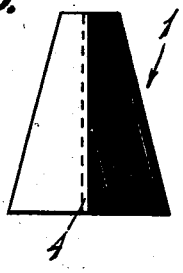
Figure 3 is a side elevation of the modification shown in Figure 2.
Figure 5:
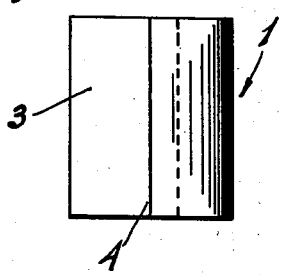
Figure 5 is a side elevation of the form shown in Figure 4.
Figure 7:
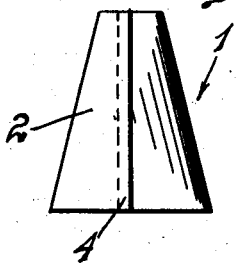
Figure 7 is a side elevation of the form shown in Figure 6.

The cup 1 is preferably formed of a fibrous material such as paper. It is open at the top and bottom and may be arranged around the plant with either the small or large end at the bottom. The sides 2 of the cup slope upwardly in the forms shown in Figures 1, 2, 3, 6, and 7. If desired, however, the sides may be straight as shown at 3 in Figures 4 and 5.

The cup is preferably formed of one integral piece of material which is then shaped into the form desired either conical, cylindrical, or prismatic. The edges of the piece overlap and are secured together by gluing or stapling as shown at 4.

The lower end of the cup is embedded in the ground so that it will remain in position around the stem of the plant. The foliage is preferably above the top of the cup and the roots extend below the bottom thereof.

Having described my invention, I claim:

A plant protector consisting of a cup adapted and arranged to surround the stem of a plant, said cup being formed of an integral sheet of fibrous material, the edges of said sheet overlapping and glued together, the walls of said cup sloping upwardly, the lower end of said cup being embedded in the ground, the major portion of the cup being positioned above the surface of the ground.

ANSELMO GARCIA.